(12) United States Patent
Young et al.

(10) Patent No.: US 6,370,190 B1
(45) Date of Patent: Apr. 9, 2002

(54) DATA RECEIVER INCLUDING HYBRID DECISION FEEDBACK EQUALIZER

(75) Inventors: Robert W. Young; James D. Collier, both of Ely (GB)

(73) Assignee: 3Com Technologies, Georgetown, KY (US)

( * ) Notice: Subject to any disclaimer, the term of this patent is extended or adjusted under 35 U.S.C. 154(b) by 0 days.

(21) Appl. No.: 09/215,129

(22) Filed: Dec. 18, 1998

(30) Foreign Application Priority Data

Sep. 15, 1998 (GB) .............................................. 9820060

(51) Int. Cl.[7] .......................... H03H 7/30; H03H 7/40; H03K 5/159
(52) U.S. Cl. ........................................ 375/233; 341/110
(58) Field of Search ................................. 375/229, 230, 375/232, 233, 256, 244, 346, 348, 349, 260, 285, 296, 224, 227, 245; 708/603, 323, 819; 333/28 R; 341/110, 126, 143, 200

(56) References Cited

U.S. PATENT DOCUMENTS 5,119,196 A  *  6/1992  Ayanoglu et al.
5,490,169 A  *  2/1996  Blackwell et al. .......... 375/232
5,650,954 A  *  7/1997  Minuhin

* cited by examiner

*Primary Examiner*—Chi Pham
*Assistant Examiner*—Jean B. Corrielus
(74) *Attorney, Agent, or Firm*—Nixon & Vanderhye P.C.

(57) ABSTRACT

A decision feedback encoder comprising an analog-to-digital converter for converting an input signal into digital signals representing decision levels, digital processing circuits responsive to signals from the converter for providing a succession of symbol values and a set of coefficients, digital-to-analog converters for converting the coefficients into corresponding analog values and analog circuits for forming a sum of the products of each of the symbol values and a respective one of said analog values to provide a feedback signal for the reduction of inter-symbol interference in the input signal.

18 Claims, 3 Drawing Sheets

DATA RECEIVER INCLUDING HYBRID DECISION FEEDBACK EQUALIZER

FIELD OF THE INVENTION

This invention relates to the reception of encoded signals employing decision feedback equalization. It is particularly though not necessarily exclusively concerned with the reception of data in the form of data packets in Ethernet or ATM data communications systems, particularly dual systems capable of operating at different frequencies such as both 10 MHz and 100 MHz.

In particular the invention is intended for use with the Ethernet local area standard in which an analog carrier signal of constant frequency has its amplitude modulated in accordance with a binary digital bit stream to be encoded. The amplitude variation applied to the analog carrier signal provides three amplitude levels, known as −1, 0 and +1 respectively, represented by a negative voltage related to a datum level, the datum level and a positive voltage relative to the datum level. Typically, a binary 0 is represented by the occurrence of two consecutive similar symbols, namely the occurrence of the same carrier amplitude in one symbol period as in the previous symbol period and a binary 1 is represented by a change from one symbol to another.

BACKGROUND TO THE INVENTION

Data signals, particularly those having more than two possible states and therefore more than one decision level, such as partial response signals or, particularly, Ethernet signals wherein the intended levels are −1, 0 and +1, suffer in transmission over most practical channels dispersion exhibited by both base line wander and inter-symbol interference. It is customary to provide, for example for each port of a device in an Ethernet system, a receiver which includes equalization, to compensate for the dispersion of the incoming signal in the transmission medium coupled to the port, and subsequent analog-to-digital conversion. It will be understood that these actions are associated with the 'physical layer' or layer 1 of the OSI model. There is an increasing trend towards integration of multiple ports in Ethernet devices and accordingly, for such devices to remain reasonably priced, it is desirable to minimize the area on a silicon chip occupied by the physical layer devices for any channel and to minimize the associated power consumption.

As is generally well known in the art, a decision feedback equalizer basically operates to provide a feedback signal representing an estimate of inter-symbol interference. Typically it comprises a multiply tapped transversal filter through which the decoded data is sequentially shifted. Individual decoded symbol values available at the taps are multiplied by respective coefficients and the products are summed to construct the estimate of the inter-symbol interference present in the received signal. This estimate is algebraically combined with the received signal before the latter is subject to analog-to-digital conversion so as to shift the received signal relative to the decision levels provided by the analog-to-digital converter.

The actual inter-symbol interference is represented by a convolution of the impulse response of the transmission path and the data passing through it. In practice it is necessary to presume initially a set of coefficients from a probability density function calculated by assuming that the input signal is represented by a pseudo-random sequence. It is then desirable to adapt the coefficient using some appropriate algorithm whereby the coefficients are adjusted to provide a measure of inter-symbol interference related to the particular data patterns being employed.

STATE OF THE ART

United States patent specification U.S. Pat. No. 5,157,690 describes an adaptive convergent decision feedback equalizer in which the coefficients and the products of the coefficients and the estimated inter-symbol interference are computed digitally.

United States patent specification U.S. Pat. No. 5,581,585 describes an analog clock timing recovery circuit including a decision feedback equalizer. It briefly describes the 'least mean squares' algorithm and briefly discusses the 'least squares' and 'recursive least square' algorithms for adapting the coefficients generated by the feedback equalizer.

United States patent specification U.S. Pat. No. 5,604,741 describes an Ethernet receiver including a three level data slicer of which the output provides symbols for a decision feedback equalizer.

Broadly, there are two techniques available for the reception of signals transmitted over a physical medium according, for example, to the well known 100 BASE-TX standard. A first is in effect an all-analog receiver wherein equalization is performed in the analog domain. A second technique is, in effect, an all digital receiver which though having some necessary analog components, such as an analog receiver before a gain control stage, performs equalization in the digital domain.

An analog receiver typically comprises an analog low pass filter coupled to a gain control stage of which the output is coupled to an analog equalizer. The output of the analog equalizer is coupled to an analog phase lock loop so as to provide recovery of a data clock required both for digital processing of the received signals and for the clocking of an analog-to-digital converter which may convert the input signal, after equalization, into a binary, non-return to zero, form. The output of the analog equalizer also provides a control signal for a gain control circuit operating the gain control stage aforementioned. Broadly speaking, such receivers require quite a complex analog filter and a complex analog equalizer. Inter-symbol interference, offset and noise are difficult to minimize; these difficulties increase at higher operating frequencies.

A typical 'digital' receiver for use in a similar context likewise has a fixed analog filter at its front end, the filter being coupled to a gain control stage of which the output is coupled to the input of a multiple level flash analog-to-digital converter. Typically for a 100 MHz system the flash converter operates at least 125 MHz and provides sixty-four levels of analog-to-digital conversion. The flash converter is coupled to the input of a digital equalising filter of which the output is coupled to a digital clock recovery circuit and to a digital automatic gain control circuit. The latter drives a digital-to-analog converter which provides the gain control signal for the aforementioned gain control stage. The digital clock recovery circuit provides a control signal for a voltage controlled oscillator which provides a recovered clock signal used in the further digital processing of the received signal and also to control the clocking of the flash converter. The final sum of the products of the previously decoded symbol values and the respective coefficients are applied to the digital representation of the input signal. Broadly, a receiver on these lines is expensive in terms of occupied chip area and power consumption.

Digital equalizers of the kind mentioned are commonly decision feedback equalizers wherein a decision or slicing level is adjusted according to a weighted sum of the values of a multiplicity of earlier received signals, the weighting being adjusted according to a suitable adaptive algorithm.

Several algorithms are known for this purpose. Generally preferred is the 'least mean squares' algorithm originally described by B Widrow. In an all digital domain, the weighting or coefficients of the previous symbols and the multiplication of the weighted values must all be performed digitally, the digital circuit operating necessarily at the symbol rate. Such a practice is expensive both in terms of area of silicon employed and power consumed.

SUMMARY OF THE INVENTION

The present invention is based on a hybrid system in which decision feedback equalization is performed by digital computation of coefficients, the conversion of those coefficients into analog form and the adjustment or equalization of the input signal in the analog domain. Broadly, in comparison with known digital systems, a system according to the invention requires many fewer fast comparators and much less fast circuitry (i.e. digital circuitry operating at or above the symbol rate) and a reduction in quantisation noise. It is moreover much easier to obtain accurate digital-to-analog conversion than analog-to-digital conversion.

Reference will hereinafter be made to the accompanying drawings, to indicate both how the invention may be put into practice and to indicate various further features of the invention.

DETAILED DESCRIPTION

The system which will be described is related to a single port of an Ethernet receiver but it is intended that the present invention can be implemented as an ASIC into a multi-port device and form a starting point for the implementation for an Ethernet hub on a single silicon chip.

Figure 1:
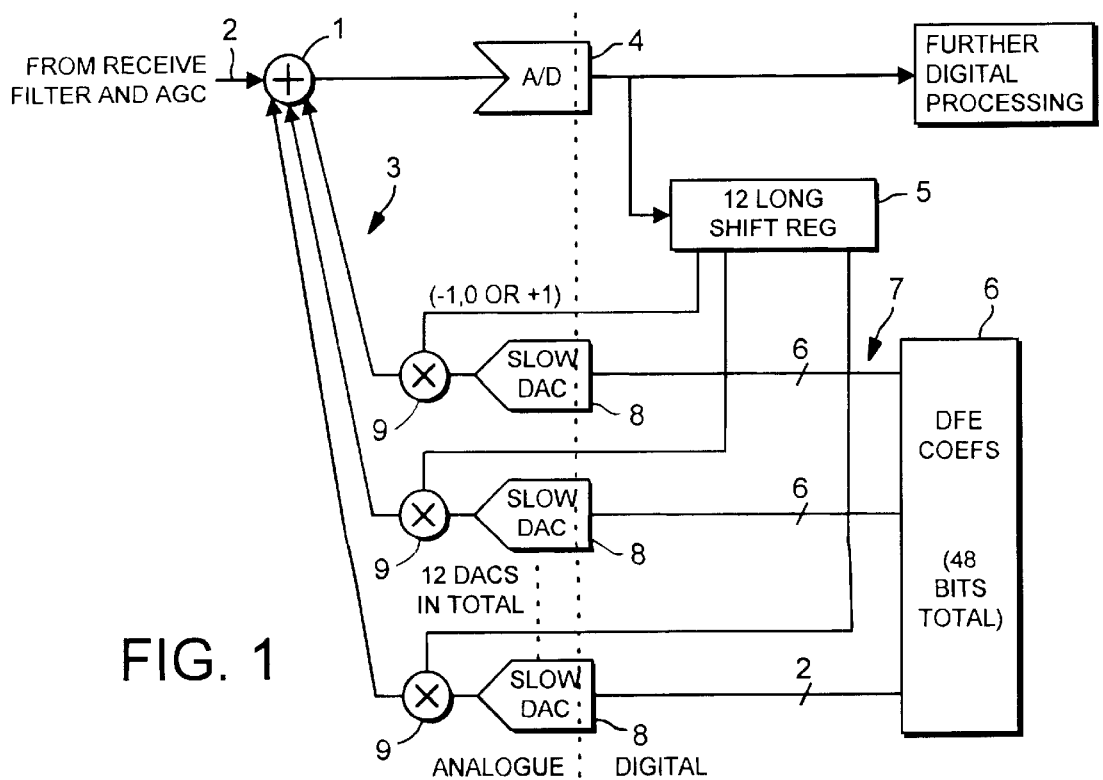
FIG. 1 is a diagram illustrating basic concept of decision feedback equalization according to the invention.

FIG. 1 illustrates in simplified form part of a receiver intended for receiving, after initial analog filtration, an Ethernet signal originally coded as a constant frequency carrier with three levels of amplitude modulation, a positive level (+1), a datum or zero level (0) and a negative level (−1). The arrangement is simplified for the purpose of explanation. An input combiner 1, which may in practice be a current mode operational amplifier, receives on an input line 2 an input data signal such as a three level signal as previously mentioned (after band-pass filtering). The combiner also has several other input lines 3. In practice, as will be seen, there are normally more than three other input lines 3, there being typically twelve components each representing a multiplication of a symbol value (−1, 0 or +1) with a coefficient obtained by means of an adaptive algorithm.

The output of the combiner 1 is input to an analog-to-digital converter (quantizer) 4 which defines several slicing levels, different combinations of which are used for different purposes. Since there are (in this example) three possible states for the symbols, two of the slicing levels may be used to decode them. The decoded symbols are fed to a shift register 5 which at any time holds the values of a set of previous symbols, in particular the twelve previously decoded symbols. Although it is not shown in FIG. 1, different slicing levels are employed for automatic gain control, the computation required for the adaptive algorithm, the monitoring of convergence and also the recovery of a clock signal to control a voltage controlled oscillator which determines the sampling time for the digital-to-analog converter.

FIG. 1 is confined to the process by which the previous symbol values and the decision feedback equalizer coefficients are employed to adjust the decision levels. The coefficients will be digitally computed (as described later) and stored in a coefficient register 6. The coefficients are provided by the register on the (12) groups of output lines 7. In practice it is found, as explained in more detail later, that the resolution of coefficients need not be constant and may diminish according as the coefficients relate to older symbols. Typically, though six-bit resolution may be typical for the three most recent previous symbols, two-bit resolution may be sufficient for older symbols and typically, for a twelve tap shift register, providing symbol values for the twelve most recently converted symbols, the total number of magnitude bits on the twelve outputs from the coefficient register may aggregate forty-eight bits rather than the seventy-two that would be required for constant resolution.

Each of the (twelve) coefficients provided by the coefficient register is converted by a respective digital-to-analog converter 8 etc into an analog signal such as a voltage or current. Each of these analog signals needs to be multiplied by the symbol value in a respective one of the multipliers 9 etc. Owing to the manner of coding, wherein the symbol values may be represented as having only the values −1, 0 or +1, the so-called multipliers 9 are required only to qualify the analog outputs from the converters 8 by one or other of these three values and may be constituted by relatively simple analog gates, each comprising for example four N channel FETs.

The scheme shown in FIG. 1 relies on digital computation of the (varying) coefficients, the conversion of those coefficients to analog form and the analog multiplication of the coefficients with symbol values. The digital-to-analog converters are not required to operate at the symbol rate but only at the rate, which is variable, at which adaptation or updating of the coefficients occurs. In practice this is significantly less than the symbol rate.

Figure 2:
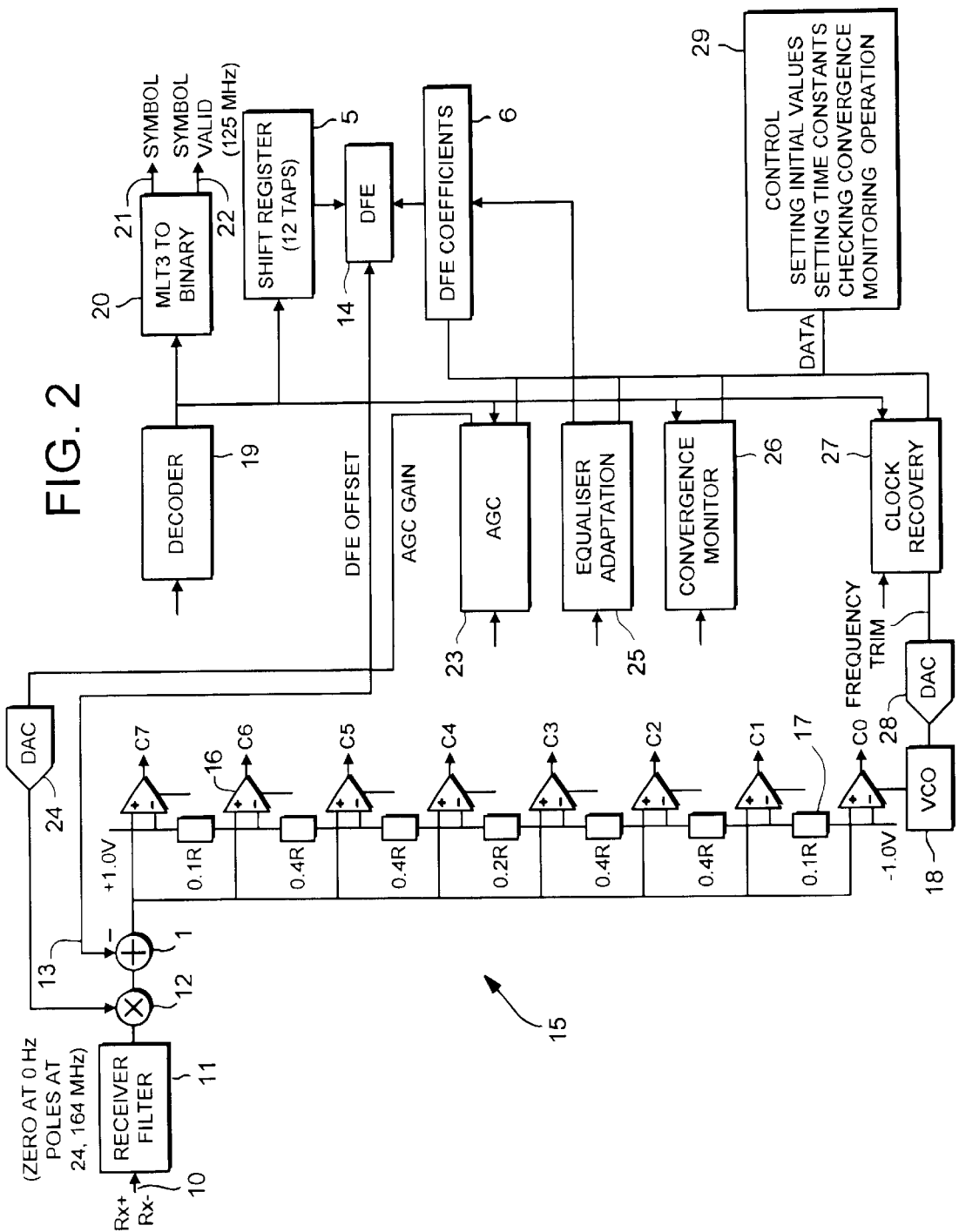
FIG. 2 is a more detailed illustration of a receiver according to the invention.

FIG. 2 illustrates, in conjunction with FIG. 1, a detailed embodiment of the invention.

In the receiver shown in FIG. 2, an input line 10 from a transmission medium (such as a twisted pair) couples an Ethernet signal to a receive filter 11. This filter and the other individual stages in FIG. 2 are more particularly discussed later. The purpose of the filter 11 is to perform a coarse equalization of the channel to reduce the length (in terms of the number of symbol values and coefficients that need to be employed) of the decision feedback equalizer and to provide band-pass filtering which when combined with the effect of the decision feedback equalizer provides baseline wander compensation without requiring an additional circuit. The filter should also set a noise bandwidth that provides a reasonable compromise between suppression of noise and distortion of the wanted signal. For the reasons discussed later, the receive filter may be a bandpass filter having a zero at zero frequency, a real axis pole at a comparatively low frequency (typically at 24 MHz) compared with the carrier frequency and another real axis pole at a frequency (such as 160 MHz) substantially above the transmission frequency. It is easy to implement these requirements by an RC filter.

The output of the filter 11 is passed through a gain control amplifier 12 which is controlled by a gain control signal in a manner to be described later. The amplifier 12 may be a two-stage amplifier with inter-stage switching for controlling the gain.

The output of the gain control amplifier 12 is coupled to the input of a combiner 1 which combines the input signal with the offset signals (produced as generally described with reference to FIG. 1 and shown as a single line 13) to correct the received signal prior to its quantisation whereby to cancel substantially the inter-symbol interference superimposed on the ideal amplitude of a current signal due to the previously received signal.

In FIG. 2, the converters 8 and multipliers 9 described with reference to FIG. 1 are shown as the DFE block 14.

The thus corrected input signal is applied to an analog-to-digital converter 15 composed of a plurality of comparators 16 each having a reference level set by a respective node in a chain of resistors 17 and another input coupled to the output from the stage 14. In practice the chain is a double chain of resistors providing differential inputs to the comparator. The particular form of the converter is not important. Sampling of the input signal is under the control of a voltage controlled oscillator 18 to be described later. The digital-to-analog converter provides eight levels of quantisation and eight binary signals C0 to C7, according as the input signal exceeds the respective level or not. The level for output C0 is defined as a negative datum voltage, such as −1 volts, and the level for output C7 is an upper, positive datum voltage such as 1 volt. The intermediate levels are set by the values of the resistors, which are preferably symmetrically arranged, as shown, the uppermost and lowermost resistors in the chain being 0.1R where R is some selectable value, the centre resistor, separating the levels for outputs C3 and C4, is 0.2R, and the remaining resistors are 0.4R.

Further, in practice the whole of the analog signal path is preferably differential, to improve immunity to noise, rather than the 'un-balanced' scheme illustrated schematically for convenience.

In order to digitize a signal which, as in the Ethernet standard, should have three values, two comparator levels are sufficient. In the present embodiment these are those for outputs C2 and C5 and occur at 25% and 75% respectively of the total range of the comparator between the levels associated with outputs C0 and C7. The outputs C2 and C5 are fed to a decoder 19 which for each symbol interval produces the respective decoded symbol value, either −1, 0 or +1 as the case may be. For example, if C2=1 and C5=0, the decoder symbol value is 0. These values are preferably coupled to a converter 20 which in accordance with the original coding converts the three level signals to an NRZ binary output on a first output line 21 and produces a 'symbol valid' signal on line 22. The output rate in this embodiment is at 125 MHz.

The decoded symbol values from the decoder 19 are successively entered into the shift register 5 which in this embodiment of the invention has twelve taps so as to provide the symbol values (−1, 0 or +1) of each of the twelve most recently received symbols. The individual symbol values are multiplied with analog versions of the decision feedback encoding coefficients as described with reference to FIG. 1, the coefficients being obtained from the coefficient register 6.

The symbol values and (as will be described) the polarity of the residual ISI are used to control an automatic gain control circuit 23 which provides a digital gain control signal to a digital-to-analog converter 24 of which the output controls the gain control amplifier 12.

The symbol values and the polarity of the residual ISI are coupled to an equalizer adaptation circuit 25 which computes and updates as necessary the equalizer coefficients in a manner to be described.

The comparator outputs C1, C3, C4 and C6 control a convergence monitor 26 which is described later but is essentially provided to indicate whether the equalizer adaptation, the automatic gain control and the clock recovery all converge satisfactorily.

The comparator outputs C1, C3, C4 and C6 are used in a clock recovery circuit 27 operable to recover and track the clock signal embedded in the receive signal. The output of the clock recovery circuit is a frequency trimming signal which is applied to a digital-to-analog converter 28 to control the voltage controlled oscillator 18 that determines the sampling times for the comparators.

The operation of the clock recovery circuit, the convergence monitor, the equalizer adaptation circuit, the automatic gain control and the computation of the coefficients for the decision feedback encoder are governed by a microprocessor 29 or other high-level control unit which, for example, sets initial values for the coefficients, sets time constants for the equalizer adaptation, checks the operation of the convergence monitor and generally handles the transfer of data between the circuits it controls. The organisation and operation of the microprocessor or high-level control unit is not directly important to the present invention and will not be described in detail.

There follows a discussion of various important parts of the system.

Receive Filter

The receive filter 11 is responsible for filtering the received signal prior to subsequent processing.

For long cable lengths, the frequency response of a 100 BASE-TX channel is strongly peaked at low frequencies, because the channel has a low pass characteristic with an attenuation in dBs that is proportional to the cable length times the square-root of frequency. This means that the channel impulse response decays quite slowly and an equalizer with only a feedback filter would have to be very long in order to reduce the residual inter-symbol interference to an acceptable level. To overcome this problem, the proposed architecture preferably uses a non-adaptive analog feedforward receive filter to perform a coarse equalization by attenuating lower frequencies and so removing the peak in the channel frequency response. This allows the length of the digital decision feedback equalizer to be reduced considerably.

Since the filter 11 is non-adaptive, it is relatively straightforward to implement as an RC filter with one transmission zero at the origin and two real axis poles as previously mentioned. The performance of the receiver is not sensitive to the exact response of the filter because the decision feedback equalizer adapts accordingly. The filter is preferably designed to be more appropriate for long cables, as these are the most difficult to equalize. In the case of shorter cables, the filter may actually increase the amount of inter-symbol interference, but this does not matter because the decision feedback equalizer is normally able to compensate.

Quantizer (ADC)

Although only two comparators 16 are required to slice the MTL3 data, two more are needed for equalization and four more for clock recovery if all transitions are to be used, making eight in total. The bandwidth required into the comparators is about 160 MHz (a 1 ns time constant) which can be achieved quite easily with a 0.5 $\mu$ or smaller CMOS process.

The comparators 16 use the minimum possible sampling rate of 125 MHz in order to provide one sample per symbol period. The clock is provided by a 125 MHz VCO whose frequency and phase is controlled by the clock recovery.

Conventional approaches to digital equalization for 100 BASE-TX require an ADC with 64 quantization levels. This requires sixty-four comparators for a flash converter, resulting in high power consumption. In the proposed architecture only eight comparators are required to fulfil all the requirements of the receiver. This is possible because the feedback signal from the decision feedback equalizer is fed back to the analog circuits via a DAC and used to modify the input signal prior to digitisation. The justification for this architecture is that, because equalization is performed prior to digitisation, most of the outputs from the sixty-four comparators used in a 6 bit ADC are not actually necessary. In fact, a maximum of eight comparators are required. This simplification is possible because, in effect, the thresholds of the comparators are modified from symbol to symbol by the decision feedback equalizer, via a DAC. The provides important power consumption and silicon area savings because fast current mode DACs are very much simpler than fast ADCs.

Symbol Decoder

The symbol decoder which comprises the decoder, converter and shift register blocks 19, 20 and in FIG. 2 is responsible for decoding the current symbol, and providing related inputs to the other blocks. It performs four functions:

(i) It calculates the MLT3 value (−1, 0 or +1) for the current symbol, using the comparator outputs C2 and C5.

(ii) It converts the MLT3 value to a binary output symbol, according as the two most recently decoded MLT3 values are the same or different.

(iii) It stores a finite length history of previous decoded symbols in a buffer (i.e. shift register 5).

(iv) It determines the polarity of the residual inter-symbol interference (ISI) in the equalized received signal (the sign of the error between the actual signal amplitude at the sampling instant and the ideal signal amplitude), using comparator outputs C0, C3, C4 and C7, i.e. levels both outside and inside the range between the levels used for determining the MLT3 value.

The polarity of the residual ISI is calculated for MLT3=+1 by determining whether C7 is 'true'; for MLT3=−1 by determining whether C0 is 'true'; and for MLT3=0 using the expression [(C4)==TRUE]-[(C3)==FALSE].

Equalizer

The equalizer (as previously described) is responsible for compensating for the signal degradation introduced by the cable, the transformers and other elements of the receive chain. It provides a correction to the received signal prior to digitisation based on a weighted sum of the previous N decoded symbols whereby to cancel the inter-symbol interference superimposed on the ideal amplitude of the current symbol. It employs a symbol history, held in the shift register 5 and constituted by the MLT3 values {−1, 0, +1} for the 12 most recent decoded symbols, and coefficient values held in register 6, one for each of the 12 taps of shift register 5. The number of bits m used to represent each coefficient depends on the coefficient index. The output from the equalizer which acts as a correction on the input signal to the comparators must have settled adequately before the next clock signal to the comparator, i.e. before the next sampling of the input signal.

The output from the DFE is calculated as follows:

$$DfeOut = \Sigma_{n=0\ to\ 11}(SymbolHistory[n] * DfeTaps[n])$$

where DfeOut is the combined output from the multipliers 8, SymbolHistory[n] is the MLT3 value obtainable from the nth tap and DfeTaps[n] is the respective coefficient.

The values of SymbolHistory [n] are {−1, 0+1} so only additions are required to calculate this expression. In fact, the expression can be implemented very efficiently using an analog circuit in which the additions are performed by summing currents.

The number of bits required to store each coefficient depends on its position, as coefficients corresponding to more recent symbols (small values of n) have the largest dynamic range, so require more bits. The bit allocation (not including sign bit) for each tap may be as follows:

| Tap, n | 0 | 1 | 2 | 3 | 4 | 5 | 6 | 7 | 8 | 9 | 10 | 11 |
|---|---|---|---|---|---|---|---|---|---|---|---|---|
| Bits | 6 | 6 | 6 | 5 | 5 | 4 | 4 | 3 | 3 | 2 | 2 | 2 |

The total number of bits over all taps is forty-eight, which determines the complexity of the analog cell for calculating the DFE output.

The significance of the least significant bit for all coefficients is the same and corresponds in this example to a feedback correction of 10 mV relative to an ideal equalized signal amplitude of 1000 mV (for a +1 MLT3 level, after automatic gain control). In other words, the resolution of each coefficient is equivalent to 1% of the wanted signal amplitude. Therefore, the maximum residual inter-symbol interface due to quantization of the coefficients is 12 * 0.5%=6% (assuming the coefficients have adapted perfectly, and not including inter-symbol interface contributions from earlier or future symbols that are not equalized by the coefficients).

Equalizer Adaption

The equalizer adaption is responsible for updating the equalizer coefficients in order to equalize the channel more accurately.

The programmable parameters controlling the operation are:

(i) 'DfeTapsInitial' which are initial values for the coefficients prior to adaption. They are preferably stored to the same precision as the DfeTaps. There may be multiple sets of default coefficients.

(ii) 'DfeLambda' which is the update rate in powers of 2. It is inversely proportional to the adaption time constant. There may be different update rates for initial acquisition and for normal operation.

In order to allow relatively long time constants for equalizer adaption, the coefficients are stored internally as DfeTapsInternal[n] using an extra 6 bits precision compared with the coefficients DfeTaps[n] that are passed to the DFE application block:

$$Dfetaps[n][m-1:0] = DfeTapsInternal[n][m+5:6]$$

where m is the number of bits passed to the equalizer block 14 for coefficient n, and the number of bits, excluding the sign bit, used for DfeTapsInternal[n] is given by:

| Tap, n | 0 | 1 | 2 | 3 | 4 | 5 | 6 | 7 | 8 | 9 | 10 | 11 |
|---|---|---|---|---|---|---|---|---|---|---|---|---|
| Bits | 12 | 12 | 12 | 11 | 11 | 10 | 10 | 9 | 9 | 8 | 8 | 8 |

The update equation for adapting each of the equalizer coefficients is:

DfeTapsInternal[n][m + 5 : 0] =

DfeTapsInternal[n][m + 5 : 0] + (DfeLambda∗IsiSign∗SymbolHistory[n]);

Note that because DfeLambda is constrained to be a power of two and both IsiSign and SymbolHistory[n] can only take values {−1, 0, +1}, the expression can be implemented using only additions and bit shifts. The new value of DfeTapsInternal[n] must be limited according to the minimum and maximum allowed values.

It will probably not be practical to update all twelve coefficients on every clock cycle. An acceptable alternative would be to implement hardware that can adapt a single coefficient per clock cycle, so that each coefficient can be updated in turn on consecutive clocks. This would increase the convergence time for the equalizer by a factor of 12.

The update equation is based on the well known least mean squares algorithm. The true least mean squares algorithm uses the actual ISI value in the update equation; however, replacing this with the sign of the ISI is a simplification to ease implementation.

Clock Recovery

The clock recovery circuit is responsible for recovering and tracking the clock embedded in the received signal. It has to determine whether the sampling point for the current symbol is early, late or acceptable. It should allow changes in phase of the receive clock (that acts as the sampling clock to the comparators) by applying temporary offsets to the frequency trim applied to the VCO. It may allow changes in frequency of the receive clock by applying permanent offsets to the frequency trim applied to the VCO. It may allow tracking of frequency errors of up to ±400 ppm between the nominal receive clock and the transmit clock embedded in the received signal.

The particular features of clock recovery circuit are not directly relevant to the present invention and will not be described in detail. It is, irrespective of the internal operation of the clock recovery circuit, important that it operates on the equalized signal since equalization occurs prior to the comparators. This makes the clock recovery much less sensitive to the inter-symbol interference introduced by the channel compared with alternative schemes that use a PLL operating on the received signal prior to equalization.

The clock recovery may use both a narrow bandwidth loop and a wide bandwidth loop. The narrow bandwidth loop would provide a long term estimate of the ideal sampling phase. Such a loop cannot track fast variations in the phase of the clock embedded in the received signal, but would suppress noise from the timing detector. The wide bandwidth loop would allow tracking of fast variations in phase, but would be more sensitive to nosie. Programmable parameters determine the bandwidths of each loop and a limit how far the overall phase estimate from the narrow band loop may deviate.

Automatic Gain Control

The automatic gain control 23 is responsible for adapting the gain applied to the input signal such that the amplitude of the equalized signal at the input to the comparators is set to the desired value. It may define a default gain value loaded prior to initial acquisition and stored to same precision as an output signal which will be fed to this digital-to-analog converter. There may be multiple initial gain values.

In order to allow relatively long time constants for automatic gain control, a gain value may be stored internally using extra bit precision compared with the output signal.

The gain may be updated by subtracting from the stored gain the product of an update rate, the current symbol value [−1, 0 or +1] and the sign of the residual inter-symbol interference. The process can be implemented using only additions. The new value of the gain should be limited according to the minimum and maximum allowed values.

It will be understood that if the symbol value and the sign of the inter-symbol interference are both positive the gain reduces, because these inputs indicate the signal amplitude was too large at the sampling point. Similarly the gain is increased if these inputs indicate the signal amplitude was too mall at the sampling point. If the symbol value is 0, then the gain is not altered because gain information cannot easily be obtained from a zero MLT3 level.

The effect of the automatic gain control is to set the median signal amplitude for the outer symbols to be equal to the ideal signal amplitude (which is determined by the outer comparator threshold levels).

Convergence Monitor

The convergence monitor 26 is responsible for indicating whether the equalizer adaption, automatic gain control and clock recovery have all converged satisfactorily. This is used by the control software to determine whether it is necessary to attempt to re-acquire using different initial coefficient and gain values.

For each decoded symbol, a binary decision is made as to whether a defined 'signal quality' for that symbol is good or bad. This is based upon whether the inter-symbol interference for the symbol exceeds 10% (where ISI above 50% causes bit errors). The decision depends on the current symbol value. If the symbol value is +1, then the comparator output C6 needs to be 'true' (i.e. the signal level was above the level associated with output C6). If the symbol value is −1, the signal level needs to be below the level for output C1. If the symbol value is 0, the signal level needs to be in the band between the levels for C3 and C4 (narrower than the band between C2 and C5). The decisions may be low pass filtered and the resultant tested against a threshold, so that if the threshold is exceeded, convergence is presumed to have occurred.

High Level Control

The high level control may include:

(i) monitoring whether the equalizer adaption, automatic gain control and clock recovery have converged correctly;

(ii) if convergence is not achieved within a specified time limit, changing the initial conditions for the equalizer and automatic gain control and restart the acquisition procedure; and (iii) once convergence has been achieved, increasing the time constants for equalizer adaption and automatic gain control in order to reduce sensitivity to noise.

The high level control may be implemented as a state machine either in software or hardware.

Figure 3:
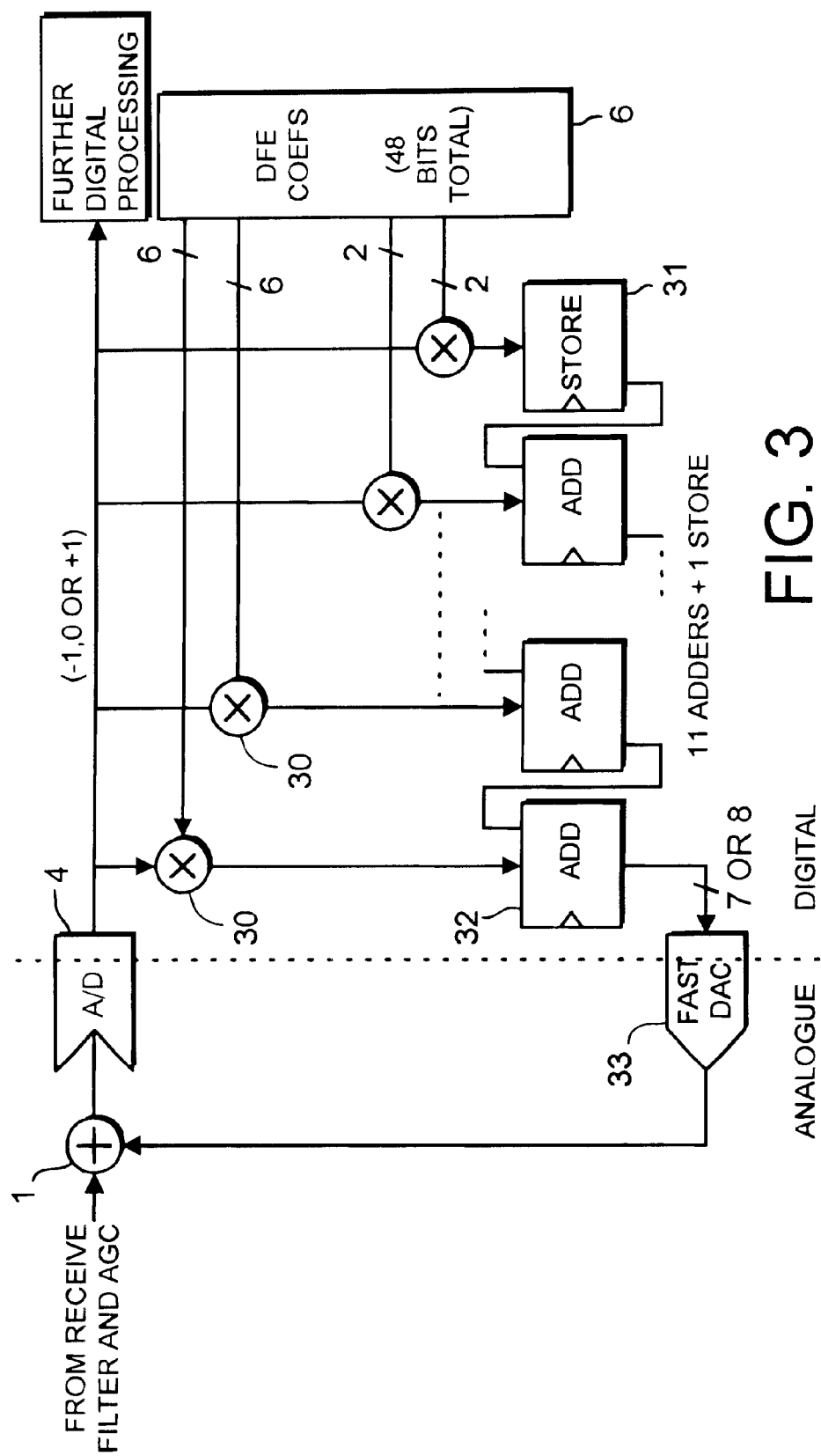
FIG. 3 is an alternative form of decision feedback equalization.

FIG. 3 illustrates a different, and currently not preferred alternative to FIG. 1. The combiner 1 drives the analog-to-digital converter 4 as before. However, each consecutive output from the converter 4 is digitally multiplied with the coefficients from the coefficient register 4 by means of respective digital multiplies 30. The products are added by means of one store 31 (in relation to the product of the coefficient for the oldest symbol) and eleven digital adders 32, the cumulative sum being output from the final adder to a fast digital-to-analog converter 33 which provides the offset signal to the combiner 1. Although such a system is an improvement over all digital receivers previously proposed, since the analog-to-digital converter 5 needs only a small number of decision levels and the fast digital-to-analog converter is more efficient than a sixty-four level analog-to-digital converter, the arrangement is not preferred because the area and power consumption are greater than for a scheme according to FIG. 1.

What is claimed is:

1. A decision feedback encoder comprising an analog-to-digital converter for converting an input signal into digital signals representing decision levels, digital processing circuits responsive to signals from the converter for providing a succession of symbol values and a set of coefficients, digital-to-analog converters for converting the coefficients into corresponding analog values and analog circuits for forming a sum of the products of each of the symbol values and a respective one of said analog values to provide a feedback signal for the reduction of inter-symbol interference in the input signal.

2. A decision feedback encoder according to claim 1 wherein the said digital circuits include means for storing digital values for said coefficients and responsive to the symbol values to compute new values for the coefficients, wherein the digital values are stored to a greater resolution than the coefficients which are converted by the digital-to-analog converters.

3. A decision feedback encoder according to claim 1 wherein the coefficients which form products with earlier symbol values are represented with lesser precision than the coefficients which form products with later symbol values.

4. A decision feedback encoder according to claim 2 wherein the analog-to-digital converter is a flash converter arranged to sample the input signal at a selected symbol rate and to provide output digital signals denoting a plurality, greater than two, of decision levels, wherein two of said levels define decision levels for decoding the input signal into symbol values and wherein said means for storing and computing is responsive to output signals denoting more than two of said decision levels.

5. A decision feedback encoder according to claim 4 further including a digital circuit responsive to outputs from the flash converter and to said symbol values to provide a digital gain control signal for the input signal and a digital-to-analog converter for the digital gain control signal.

6. A decision feedback encoder according to claim 1 wherein the analog circuits for forming the sum of the products comprise analog gates each disposed to pass one of the analog coefficient values modified by the respective symbol value and an analog adder having a multiplicity of inputs each coupled to one of the gates and an input for the input signal.

7. A decision feedback encoder comprising:
an analog to digital converter for converting an input signal into digital signals representing decision levels;
a digital processing circuit responsive to said digital signals from the converter to provide a succession of symbol values;
means for storing digital values of coefficients;
digital to analog converters for converting said coefficients into corresponding analog values; and
analog circuit means for forming a sum of the products of each of said symbol values with a respective one of said analog values to provide a feedback signal for the reduction of inter-symbol interference in said input signal.

8. A decision feedback encoder according to claim 7 further comprising a digital coefficient adaptation circuit coupled to said digital processing circuit and to said means for storing and responsive to symbol values from said digital processing circuit to compute new values for said coefficients.

9. A decision feedback encoder according to claim 8, wherein said analog to digital converter is a flash converter for sampling said input signal at a selected symbol rate and for providing output digital signals denoting a plurality, greater than two, of decision levels, wherein two of said levels define decision levels for decoding said input signal into said symbol values and wherein said digital coefficient adaptation circuit is responsive to output signals denoting more than two of said decision levels.

10. A decision feedback encoder according to claim 7, wherein said analog circuit means comprise analog gates each disposed to pass one of said analog values modified by the respective symbol value and an analog adder having a multiplicity of inputs each coupled to one of said gates and an input for said input signal.

11. A decision feedback encoder comprising:
an analog to digital converter for converting an input signal into digital signals representing decision levels;
a first digital processing circuit responsive to signals from the converter to provide a succession of symbol values;
shift register means for storing a succession of said symbol values;
means for storing a set of digital coefficients;
a second digital processing circuit responsive to said symbol values to compute new values for said coefficients, said means for storing being coupled to said second digital processing circuit to store said new values for said digital coefficients;
digital to analog converters for converting said digital coefficients into corresponding analog values;
analog circuit means for forming a plurality of analog products, each product being the product of a respective symbol value and a respective one of said analog values; and
analog circuit means for combining said products and for offsetting said input signal in accordance with the sum of said products to reduce inter-symbol interference in said input signal.

12. A system for providing a measure of inter-symbol interference related to data patterns, the system comprising:
a decision feedback encoder for receiving encoded signals, the encoder comprising,
an analog-to-digital converter for converting an input signal into digital signals, said digital signals representing decision levels;
a signal processing circuit for processing said digital signals to produce a succession of symbol values and a set of coefficients;
digital-to-analog converters for converting said coefficients into corresponding analog values; and
analog circuit means for forming a sum of products of each of said symbol values with a respective one of said analog values to provide a feedback signal to reduce inter-symbol interference in said input signal.

13. The system as in claim 12, wherein said decision feedback encoder further comprises:
storage means for storing digital values of said coefficients; and a digital coefficient adaptation circuit coupled to the signal processing circuit and said storage means, said adaptation circuit responsive to symbol values from said signal processing circuit in order to compute new values for said coefficients.

14. The system as in claim 12, wherein said analog-to-digital converter is a flash converter for sampling said input signal and for providing output digital signals representing a plurality of decision levels.

15. The system as in claim 14, wherein at least two of said decision levels enable decoding said input signal into said symbol values.

16. The system as in claim 13, wherein said adaptation circuit is responsive to output signals denoting more than two of said decision levels.

17. The system as in claim 12, wherein said analog circuit means comprises:

a plurality of analog gates, each analog gate disposed to pass one of said analog values modified by a respective symbol value;

analog adder circuit having a multiplicity of inputs, each said input coupled to a respective analog gate and an input for said input signal.

18. A method for providing a measure of inter-symbol interference related to data patterns, the method comprising:

receiving encoded signals using a decision feedback equalizer;

converting an input signal into digital signals, said digital signals representing decision levels;

processing said digital signals to produce a succession of symbol values and a set of coefficients;

converting said coefficients into corresponding analog values; and forming a sum of products of each of said symbol values with a respective one of said analog values to provide a feedback signal to reduce inter-symbol interference in said input signal.

* * * * *